United States Patent
Park et al.

(10) Patent No.: US 9,217,433 B2
(45) Date of Patent: Dec. 22, 2015

(54) SYNTHETIC RESIN BEARING AND SCROLL COMPRESSOR HAVING THE SAME

(71) Applicant: LG ELECTRONICS INC., Seoul (KR)

(72) Inventors: Jinsung Park, Seoul (KR); Eunsoo Yang, Seoul (KR); Chuljig Bae, Seoul (KR); Byeongchul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 98 days.

(21) Appl. No.: 14/031,397

(22) Filed: Sep. 19, 2013

(65) Prior Publication Data

US 2014/0086777 A1    Mar. 27, 2014

(30) Foreign Application Priority Data

Sep. 24, 2012 (KR) .................. 10-2012-0106072

(51) Int. Cl.
*F01C 1/02* (2006.01)
*F01C 5/00* (2006.01)
*F03C 2/00* (2006.01)
(Continued)

(52) U.S. Cl.
CPC .............. *F04C 29/02* (2013.01); *F04C 15/0073* (2013.01); *F04C 18/0215* (2013.01); *F16C 33/201* (2013.01); *F04C 23/008* (2013.01); *F04C 2210/14* (2013.01); *F04C 2240/50* (2013.01); *F04C 2240/54* (2013.01);
(Continued)

(58) Field of Classification Search
CPC .............. F04C 18/0215; F04C 18/0253; F04C 23/008; F04C 27/005; F04C 29/0057; F04C 29/023; F04C 29/026; F04C 2210/14; F04C 2230/91; F04C 2240/50; F04C 2240/56; F04C 2240/809; F01C 1/0215; F01C 1/0246; F01C 1/0253; F01C 2/04; F16C 13/02; F16C 27/02; F16C 33/20; F16C 33/201; F16C 33/74; F16C 2208/00; F16C 2208/36
USPC .......... 418/152–153, 178–179, 55.1–55.6, 57; 384/297, 908
See application file for complete search history.

(56) References Cited

U.S. PATENT DOCUMENTS

| | | | |
|---|---|---|---|
| 4,623,590 A | 11/1986 | Hodes et al. | |
| 5,568,983 A * | 10/1996 | Wilson | 384/295 |
| 6,332,716 B1 * | 12/2001 | Kato et al. | 384/908 |
| 2002/0015839 A1 * | 2/2002 | Niwa et al. | 384/908 |

FOREIGN PATENT DOCUMENTS

| | | |
|---|---|---|
| CN | 1153547 A | 7/1997 |
| CN | 1697940 A | 11/2005 |

(Continued)

OTHER PUBLICATIONS

Korean Notice of Allowance dated Aug. 22, 2013 for corresponding Application No. 10-2012-0106072.
Chinese Office Action issued in Application No. 201310439405.0 dated Jul. 3, 2015.

*Primary Examiner* — Theresa Trieu
(74) *Attorney, Agent, or Firm* — Ked & Associates, LLP

(57) ABSTRACT

A synthetic resin bearing and a scroll compressor using the same are provided. In the synthetic resin bearing as a journal bearing fixed to an orbiting scroll or a main frame and relatively rotated with respect to a rotational shaft in a scroll compressor, the journal bearing is made of a PEEK material, and a thickness t of the journal bearing is smaller than a thickness t1 with which a temperature in a contact surface thereof with the rotational shaft during an operation of the scroll compressor corresponds to a glass transition temperature.

14 Claims, 4 Drawing Sheets

(51) Int. Cl.
  *F04C 2/00* (2006.01)
  *F04C 29/02* (2006.01)
  *F04C 15/00* (2006.01)
  *F04C 18/02* (2006.01)
  *F16C 33/20* (2006.01)
  *F04C 23/00* (2006.01)

(52) U.S. Cl.
  CPC ........ *F05C 2225/12* (2013.01); *F16C 2208/00* (2013.01); *F16C 2208/36* (2013.01)

(56) References Cited

FOREIGN PATENT DOCUMENTS

| | | | |
|---|---|---|---|
| JP | 2002005050 A | 1/2001 | |
| JP | 2003003970 A | 1/2003 | |
| JP | 2012122498 A | 6/2012 | |
| KR | 10-0745645 | 7/2007 | |
| KR | 101059880 B1 * | 8/2011 | .............. F04C 18/02 |
| WO | WO2012020740 A1 * | 2/2012 | .............. F04C 18/02 |

* cited by examiner

SYNTHETIC RESIN BEARING AND SCROLL COMPRESSOR HAVING THE SAME

CROSS-REFERENCE TO RELATED APPLICATION

Pursuant to 35 U.S.C. §119(a), this application claims the benefit of earlier filing date and right of priority to Korean Application No. 10-2012-0106072, filed on Sep. 24, 2012, the contents of which is incorporated by reference herein in its entirety.

BACKGROUND OF THE INVENTION

1. Field of the Invention

The present disclosure relates to a synthetic resin bearing and a scroll compressor using the same, and more particularly, to a bearing interposed between a rotational shaft of a scroll compressor and an orbiting scroll to reduce friction loss, and a scroll compressor having the same.

2. Background of the Invention

In general, a scroll compressor is a compressor compressing a refrigerant by changing a volume of a compression chamber formed by a pair of scrolls facing each other. In comparison to a reciprocating compressor or a rotary compressor, a scroll compressor has high efficiency, generates less vibration and noise, and is small and lightweight, and thus, it is commonly used in air-conditioners.

FIG. 1 is a cross-sectional view schematically illustrating an example of a scroll compressor. Referring to FIG. 1, the scroll compressor includes a main frame fixed within a casing (not shown) therein, and an orbiting scroll 20 is installed above the main frame 10 such that it is rotationally driven. In addition, a fixed scroll 30 is disposed above the orbiting scroll 20 and a rotational shaft 40 for rotationally driving the orbiting scroll 20 is installed within the main frame 10 and the orbiting scroll 20.

In detail, the rotational shaft 40 passes through a shaft insertion hole 12 formed in the main frame 10 and is fixed in a state in which an end portion thereof is inserted into a boss portion 22 formed on the bottom of the orbiting scroll 20. Here, in order to allow the rotational shaft to be smoothly rotated, a journal bearing in the form of a bush is inserted into the shaft insertion hole 12 and the boss portion 22.

In the related art scroll compressor, a polytetrafluoroethylene (PTFE)-based bearing formed by coating sintered particles or a magnetic lubricating resin for reinforcing a lubricating function on a surface of a support made of a steel material and a white metal-based bearing having lubricating characteristics reinforced by laminating an aluminum alloy on a surface of a support have been used as a journal bearing. In detail, on a surface of a support having a thickness of about 2 mm, a bronze sintered layer and a functional surface containing Teflon may be formed or a white metal such as aluminum may be laminated to satisfy rigidity (stiffness), abrasion resistance, lubricating performance.

Meanwhile, there have been attempted to reduce an overall size and weight of a compressor. In particular, in a scroll compressor having a configuration in which an end portion of a rotational shaft extends to an upper portion of a disk of an orbiting scroll through the disk, sizes of the orbiting scroll and a fixed scroll should be increased to obtain a sufficient compression ratio, and thus, the necessity of reducing a volume and weight is increased.

The above references are incorporated by reference herein where appropriate for appropriate teachings of additional or alternative details, features and/or technical background.

SUMMARY OF THE INVENTION

Therefore, an aspect of the detailed description is to provide a synthetic resin bearing capable of reducing a size of a compressor, while providing a sufficient degree of lubricating performance and abrasion resistance.

Another aspect of the detailed description is to provide a scroll compressor having the foregoing synthetic resin bearing.

To achieve these and other advantages and in accordance with the purpose of this specification, as embodied and broadly described herein, a synthetic resin bearing as a journal bearing fixed to an orbiting scroll or a main frame and relatively rotated with respect to a rotational shaft in a scroll compressor, wherein the journal bearing is made of a PEEK material, and a thickness t of the journal bearing is smaller than a thickness t1 with which a temperature in a contact surface thereof with the rotational shaft during an operation of the scroll compressor corresponds to a glass transition temperature.

The thickness t1 may be set to be smaller than 2 mm, and t<1 mm may be satisfied.

The journal bearing may be press-fit to the orbiting scroll or the main frame so as to be fixed, and the thickness t may be set to be greater than a minimum thickness t2 with which the journal bearing is press-fit without plastic deformation.

When the orbiting scroll or the main frame is made of iron, 0.17 mm<t may be satisfied.

The thickness t of the journal bearing may satisfy 0.17 mm<t<1 mm.

To achieve these and other advantages and in accordance with the purpose of this specification, as embodied and broadly described herein, a scroll compressor includes: a casing; a main frame fixed to the casing and having a shaft insertion hole formed therein; a fixed scroll fixed to the casing and disposed above the main frame; an orbiting scroll forming a compression chamber together with the fixed scroll and having a boss portion formed on a lower surface thereof; a rotational shaft rotatably driven and having an end portion insertedly fixed in the boss portion in a state in which the rotational shaft is insertedly positioned in the shaft insertion hole; and a journal bearing fixedly press-fit to the shaft insertion hole and the boss portion and made of a PEEK material, wherein when a thickness with which a temperature in a contact surface between the rotational shaft and the journal bearing during an operation of the scroll compressor corresponds to a glass transition temperature is t1, and a minimum thickness with which the journal bearing is press-fit to the shaft insertion hole or the boss portion without plastic deformation is t2, a thickness t of the journal bearing satisfies t2<t<t1.

The thickness t1 may be 1 mm.
The thickness t2 may be 0.17 mm.
The boss portion may be disposed to be coplanar with an orbiting wrap of the orbiting scroll.

According to embodiments of the present invention, since the journal bearing is formed of a PEEK material, abrasion resistance and lubricating performance equal to or more than those of the conventional PTFE-based bearing or white metal-based bearing having a support can be secured, while a thickness of the bearing can be reduced. Thus, a size of the compressor can be reduced and a degree of freedom of designing can be enhanced. In particular, a compression ratio greater than that of a scroll compressor in which a rotational shaft is positioned to be coplanar with an orbiting wrap.

Also, in determining a maximum thickness of the journal bearing, since the maximum thickness is determined in consideration of a glass transition temperature, the journal bearing can be effectively prevented from being deformed or fused by heat during an operation of the scroll compressor.

In addition, in determining a minimum thickness of the journal bearing, since the minimum thickness is determined in consideration of a plastic deformation during a press-fitting operation, the journal bearing can be easily and firmly coupled.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

The embodiments will be described in detail with reference to the following drawings in which like reference numerals refer to like elements wherein:

In the drawings:

FIG. 1 is a cross-sectional view schematically illustrating a portion of a general scroll compressor.

FIG. 2 is a cross-sectional view illustrating an example of a scroll compressor employing an example of a synthetic resin bearing according to an embodiment of the present invention.

FIG. 3 is a graph showing a temperature difference between the interior and exterior of a journal bearing over a thickness and a bearing load thereof.

FIG. 4 is a graph showing a comparison between amounts of abrasion of the related art journal bearing and the embodiment.

FIG. 5 is a cross-sectional view illustrating another example of a scroll compressor employing an example of a synthetic resin bearing according to an embodiment of the present invention.

DETAILED DESCRIPTION OF THE INVENTION

Hereinafter, a synthetic resin bearing and a scroll compressor using the same according to embodiments of the present invention will be described in detail with reference to the accompanying drawings.

Figure 1:
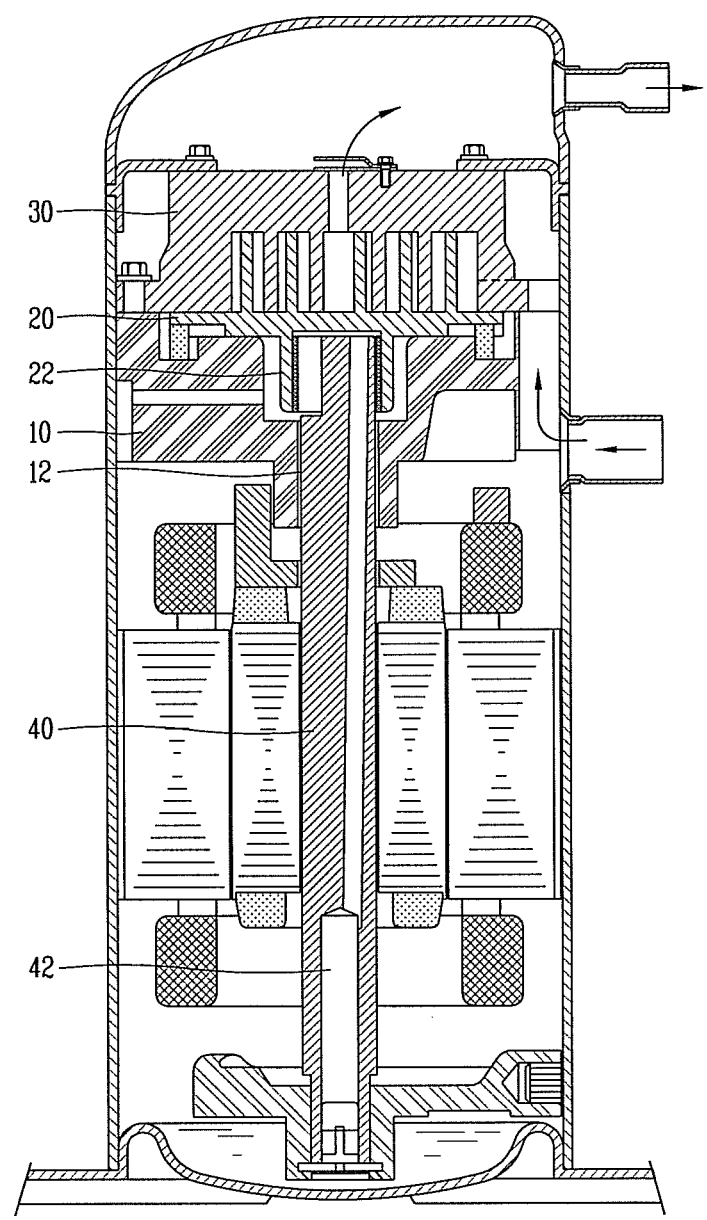
Figure 2:
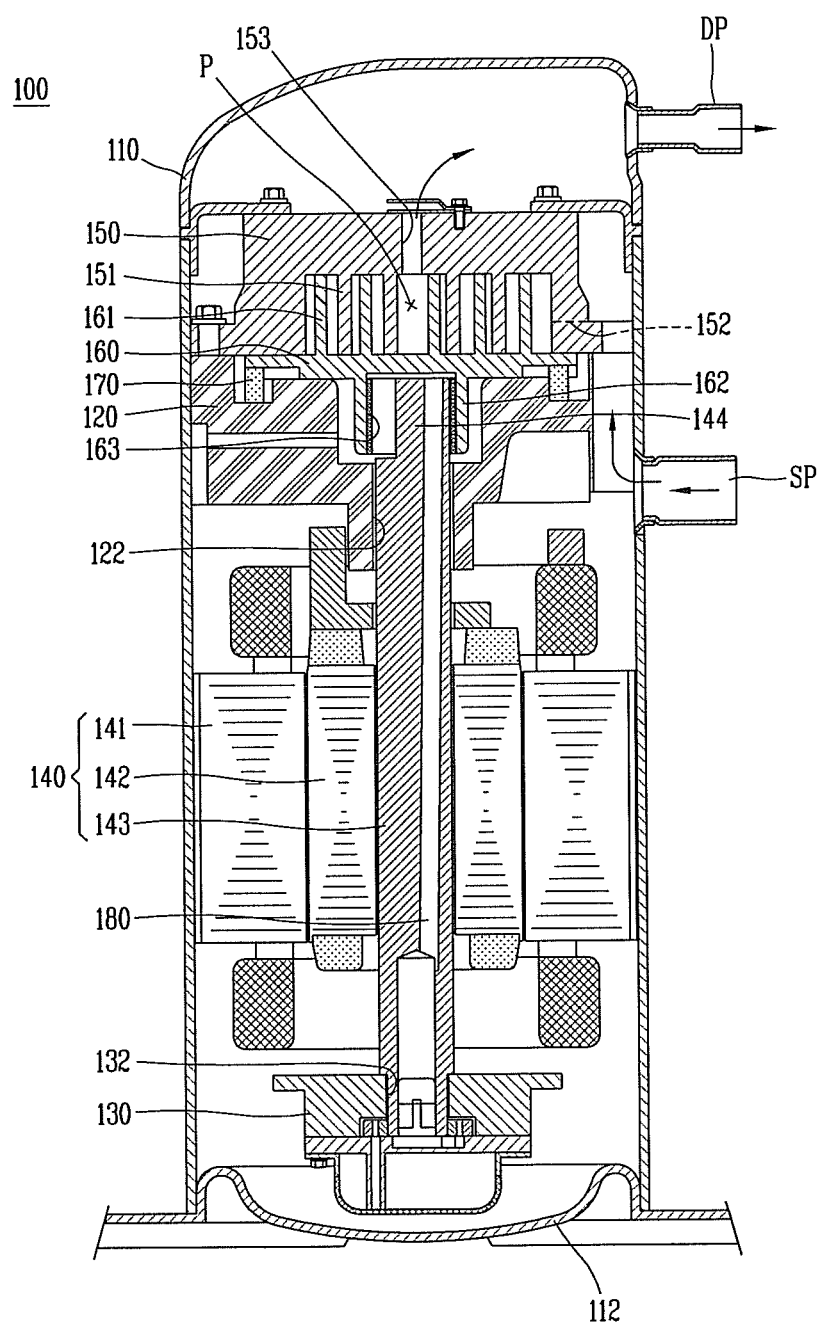

FIG. 2 is an internal cross-sectional view illustrating an example of a scroll compressor employing an example of a synthetic resin bearing according to an embodiment of the present invention. Here, the present inventive concept is not necessarily limited to the scroll compressor and, obviously, may be applied to any type of compressor using a bearing to reduce frictional resistance with respect to a rotational shaft. Referring to FIG. 2, in a scroll compressor 100 according to an embodiment of the present invention, a main frame 120 and a subframe 130 are installed within an airtight container 110, a driving motor 140 as an electric unit is installed between the main frame 120 and the subframe 130, and a compression unit including a fixed scroll 150 and an orbiting scroll 160 are installed above the main frame 120 and coupled to the driving motor 140 to compress a refrigerant.

The driving motor 140 includes a stator 141 around which a coil is wound, a rotor 142 rotatably inserted into the stator 141, and a rotational shaft 143 press-fit to the center of the rotor 142 to transmit rotatory power to a compression mechanism unit. The rotational shaft 143 has a driving pin portion 144 formed to be protruded from an upper end thereof such that it is eccentric with respect to a rotation center thereof.

The compression mechanism unit includes the fixed scroll 150 fixed to an upper surface of the main frame 120, the orbiting scroll 160 mounted on the upper surface of the main frame 120 such that it is engaged with the fixed scroll 150, and an oldhamring 170 disposed between the orbiting scroll 160 and the main frame 120 to prevent rotation of the orbiting scroll 160.

The fixed scroll 150 includes a fixed wrap 151 wound in a spiral manner to configure a compression chamber P together with an orbiting wrap 161, and the orbiting scroll 160 includes an orbiting wrap 161 wound in a spiral manner and engaged with a fixed wrap 151 to form the compression chamber P. A boss portion 162 is protruded from a lower surface of the orbiting scroll 160, namely, from the opposite side of the orbiting wrap 161, and coupled to the rotational shaft 143 to receive rotator power therefrom.

A first bearing 163 is coupled to the boss portion 162 of the orbiting scroll 160 such that it slides in a radius direction of the driving pin portion 144 of the rotational shaft 143. An outer diameter of the first bearing 163 is substantially equal to an inner diameter of the boss portion 162 of the orbiting scroll 160, and the first bearing 163 serves to reduce frictional contact between the rotational shaft 143 and the orbiting scroll 160. A second bearing 122 is also installed within the main frame 120 to reduce frictional contact between the rotational shaft 143 and the main frame 120, and a third bearing 132 is installed within the subframe 130. Oil is supplied to the first to third bearings 122, 132, and 163 to allow for a smooth lubricating operation.

In detail, when power is applied to the driving motor 140 and the rotational shaft 143 is rotated, the orbiting scroll 160 eccentrically coupled to the rotational shaft 143 makes a rotational movement (or an orbiting movement) along a predetermined trace, and as the compression chamber P formed between the orbiting scroll 160 and the fixed scroll 150 is continuously moved to the center of the rotational movement, a volume thereof is reduced to continuously suck, compress, and discharge a refrigerant.

In order to reduce frictional contact between the respective components of the compression unit, an appropriate amount of oil should be supplied thereto, and in this case, such oil is injected into and stored in a base 112 of the airtight container 110. The injected oil may be supplied to the interior of the compression unit and the first to third bearings through an oil flow path 180.

Reference numeral 152 denotes a suction opening, reference numeral 153 denotes a discharge opening, reference letters SP denotes a suction pipe, and reference letters DP denotes discharge pipe.

Here, the first to third bearings are made of a PEEK material, and have an annular shape having an inner diameter corresponding to an outer circumferential surface of the rotational shaft 143, respectively. As described above, a lubricating and cooling operation is performed as oil stored in the base 112 of the airtight container 110 is supplied to the first to third bearings. A supply amount of oil is affected by operational conditions of the compressor and external variables, so it is not uniformly maintained. In particular, without an oil supply, heat generated due to frictional contact between the rotational shaft 143 and the bearings is transmitted to the main frame 120, the orbiting scroll 160, or the subframe 130, so as to be cooled.

Figure 3:
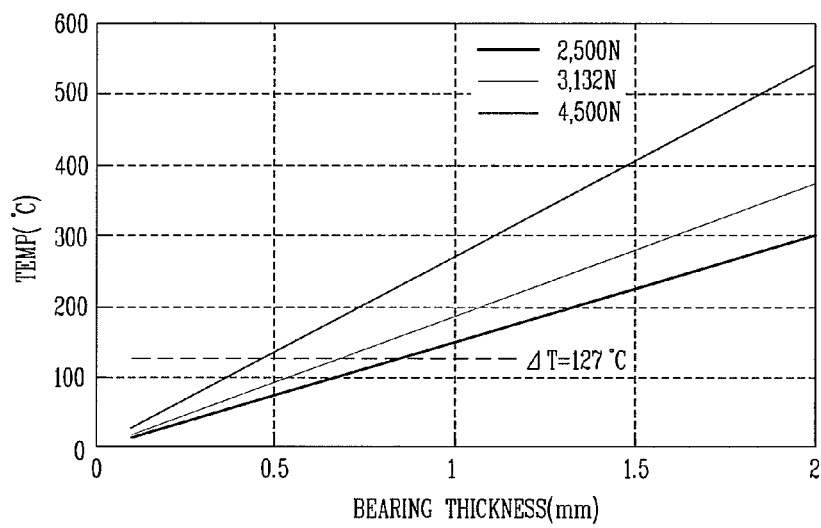

Such a heat transmission is affected by a thickness of the bearings. Namely, as a thickness of the bearings is increased, heat transmission resistance is increased to reduce a heat transfer rate, increasing a possibility that the bearings surrender to heat and are fused to an ambient structure. FIG. 3 is a graph showing a temperature difference between the interior and exterior of a bearing over a thickness thereof, as obtained through experiment by the inventor of the present application. As shown, it can be seen that when a load applied to the bearing is 4,500N, a larger amount of frictional heat is generated, and thus, a temperature difference is increased.

In case of a PEEK material as an amorphous material, it has a glass transition temperature. When it is assumed that an ambient temperature of the main frame is room temperature, the lowest temperature of the bearing that may be cooled due to heat transmission to the main frame 120 may be assumed to be 25° C. Thus, in order for the temperature at the frictional surface with respect to the rotational shaft 143 to be maintained at below 152° C., the temperature difference should be maintained at below 127° C.

In a so-called 'Cheer' condition, among operational conditions of the compressor, a load of approximately 2500 N is applied. Thus, according to the graph of FIG. 3, a thickness of the bearing should be less than 1 mm. However, such a thickness is based upon the premise that the PEEK material of the bearing has a heat transfer coefficient of 0.5 W/mk, so, in case of using a PEEK material having a higher heat transfer coefficient, a limit value of the thickness may be increased. For example, in a case in which a heat transfer coefficient is 1.8 W/mk, an upper limit of the bearing thickness may be increased to 2 mm.

Search results show that, in case of a PEEK material having a heat transfer coefficient of 0.9 W/mk, an upper limit of a thickness thereof is 0.9 mm under the Cheer condition, 0.7 mm under an ARI condition, and 0.5 mm under an overload condition in which a load of 4500N is applied.

In consideration of this, the smaller the bearing has a thickness, the better in terms of prevention of fusion due to heat, but if the thickness of the bearing is too thin, problems may arise in terms of strength and press-fit force. The bearing is press-fit to be fixed to the main frame 120, the subframe 130, and the orbiting scroll 160. In this case, a press-fit length is approximately 40 μm. When the bearing is press-fit to have a press-fit length of 40 μm in consideration the fact that the main frame 120, the subframe 130, and the orbiting scroll 160 are made of iron and in consideration of the physical properties of the PEEK material, the PEEK material may be deformed by a maximum of about 33 μm.

In consideration of the fact that elongation of the PEEK material is a maximum of 20%, 33 μm/0.2=0.17 mm. Thus, in order for the bearing to be press-fit without deformation, it is required to have a thickness of at least 0.17 mm or greater. To sum up, the first to third bearings has an annular shape, made of a PEEK material, and are formed to have a thickness ranging from 0.17 mm to 2 mm. Of course, the upper limit of the thickness may be differently set according to operational conditions of the compressor as mentioned above.

According to the research results, the first to third bearings of the scroll compressor 100 according to an embodiment of the present invention were formed to have a thickness of 1 mm. The fabricated bearings were tested together with a bearing formed by coating a surface of a conventional copper-based back steel having a thickness of 2 mm with a Teflon material and a bearing made of an aluminum (Al) material.

Figure 4:
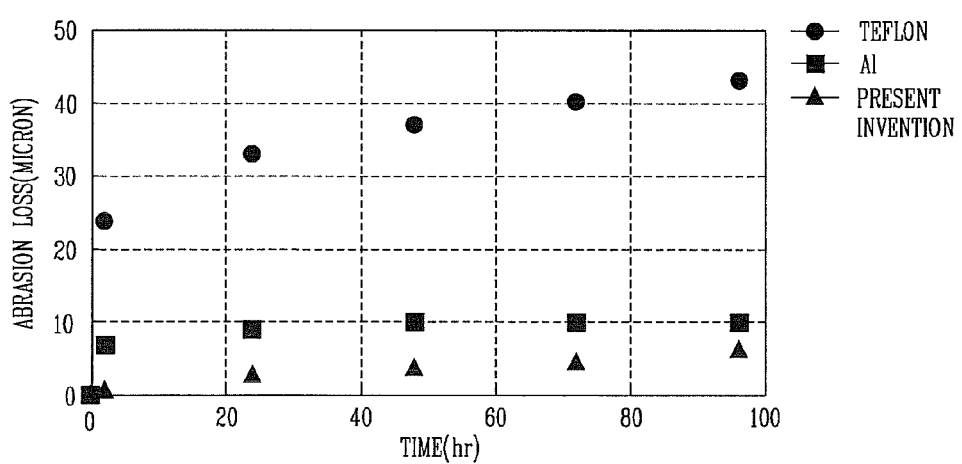

Test conditions were that a load was 3500N, the compressor was operated at a speed of 60 Hz for ten seconds and stopped for ten seconds, repeatedly. FIG. 4 shows the test results in which, it can be seen that, the bearing made of a Teflon material had abrasion of about 43 μm after the lapse of about 100 hours, the baring made of aluminum had abrasion of about 10 μm after the lapse of about 100 hours, and the bearing according to the embodiment had abrasion of about 6 μm after the lapse of about 100 hours.

In the case of the bearing according to the embodiment, although the bearing has a thickness of a half of that of the existing bearings, it has excellent abrasion resistance characteristics. Also, in consideration of abrasion versus thickness, the bearing may have a smaller thickness if cooling performance is secured. The reduced thickness may lead to a reduction in a size of the scroll compressor and may be utilized to provide a higher compression ratio over the same size. In addition, in the case of the scroll compressor, in order to prevent the orbiting scroll from retreating due to gas pressure, back pressure should be applied to a rear surface of the orbiting scroll. As the back pressure, a partial amount of compressed gas existing in the compression chamber is applied, and in the case of using the conventional bearing, it is difficult to increase a size of the bearing as large as desired due to the back pressure supply structure, but in the case of the embodiment, such a restriction in design can be eliminated.

Also, the bearing according to the embodiment is made of the same material overall, rather than coating a predetermined surface with a material having abrasion resistance characteristics, and thus, although it is abraded for the use of a long period of time, lubricating characteristics and abrasion resistance thereof are substantially uniformly maintained.

Figure 5:
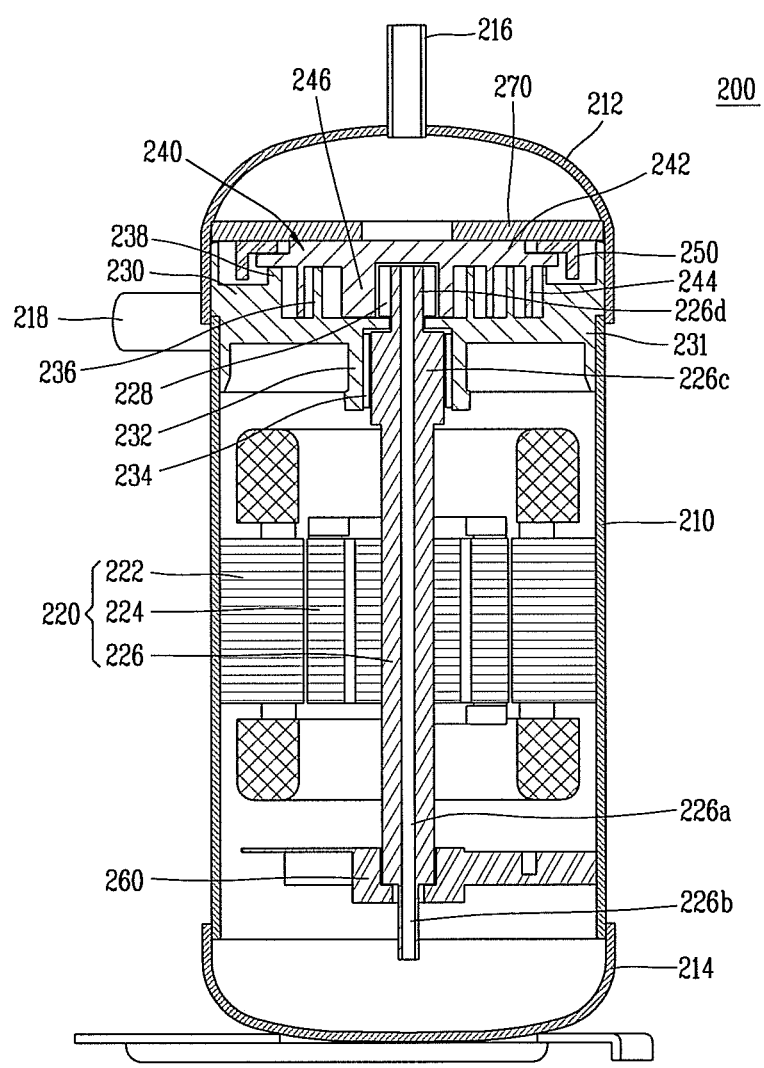

Meanwhile, the synthetic resin bearing according to an embodiment of the present invention may also be applied to a so-called 'shaft penetrating' scroll compressor in which a fixed scroll can double as a main frame, while omitting a main frame. The term 'shaft penetrating' is applied in consideration of the fact that a rotational shaft is inserted to penetrate through a disk of a fixed scroll. FIG. 5 illustrates a second example of a scroll compressor employing an example of a synthetic resin bearing according to an embodiment of the present invention.

Referring to FIG. 5, the scroll compressor 200 according to the second embodiment of the present invention includes an upper shell 212, a lower shell 214, and a casing 210. The upper shell 212 and the lower shell 214 are welded to the casing 210 to form an airtight space together with the casing 210.

A discharge pipe 216 is installed on an upper portion of the upper shell 212. The discharge pipe 216 is a passage through which a compressed refrigerant is discharged to the outside, and an oil separator (not shown) for separating oil mixed in the discharged refrigerant may be connected to the discharge pipe 216. A suction pipe 218 is installed on a lateral surface of the casing 210. The suction pipe 218 is a passage through which a refrigerant to be compressed is introduced. In FIG. 5, the suction pipe 218 is positioned in a boundary surface between the casing 210 and the upper shell 212, but a position thereof may be arbitrarily set. In addition, the lower shell 214 may also serve as an oil chamber for storing oil supplied to allow the compressor to be smoothly operated.

A motor 220 as a driving unit is installed in a substantially central portion within the casing 210. The motor 220 includes a stator 222 fixed to an inner surface of the casing 210 and a rotor 224 positioned within the stator 222 and rotated according to an interaction with the stator 222. A rotational shaft 226 is disposed in the center of the rotor 224, and the rotor 224 and the rotational shaft 226 are rotated together.

An oil flow path 226a is formed in a central portion of the rotational shaft 226 and extends in a length direction of the rotational shaft 226, and an oil pump 226b is installed in a lower end portion of the rotational shaft 226 to supply oil stored in the lower shell 214 upwardly. The oil pump 226b may be configured to have a recess having a spiral form within the oil flow path. Alternatively, the oil pump 226b may include an impeller, or a positive displacement pump may be installed as the oil pump.

A enlarged diameter portion 226c is disposed in an upper end portion of the rotational shaft 226 such that it is insertedly positioned within a boss portion formed in the fixed scroll as described hereinafter. The enlarged diameter portion 226c is formed to have a diameter larger than those of other portions, and a pin portion 226d is formed in an end portion of the enlarged diameter portion 226c. An eccentric bearing 228 is inserted into the pin portion 226d.

A fixed scroll 230 is installed in a boundary portion between the casing 210 and the upper shell 212. The fixed scroll 230 is press-fit to be fixed in a shrinkage fitting manner between the casing 210 and the upper shell 212 or may be coupled together with the casing 210 and the upper shell 212 through welding.

A boss portion 232 is formed on a lower surface of the fixed scroll 230, in which the rotational shaft 226 is inserted. A through hole is formed on an upper surface (on the basis of FIG. 5) of the boss portion 232 to allow the pin portion 226d to penetrate therethrough. Accordingly, the pin portion 226d is protruded upwardly from a disk 231 of the fixed scroll 230 through the through hole. A first bearing 234 for reducing frictional contact with the rotational shaft 226 is installed on an inner surface of the boss portion 232.

A fixed wrap 236 is formed on an upper surface of the disk 231 and enmeshed (or engaged) with an orbiting wrap as described hereinafter to form a compression chamber. A space portion accommodating an orbiting scroll 240 as described hereinafter is formed on an outer circumferential portion of the disk 231, and a side wall portion 238 is formed to be contiguous with an inner circumferential surface of the casing 210.

The orbiting scroll 240 is installed above the fixed scroll 230. The orbiting scroll 240 includes a disk 242 having a substantially circular shape and an orbiting wrap 244 enmeshed with the fixed wrap 236. A rotational shaft coupling portion 246 having a substantially circular shape is formed in a central portion of the disk 242 to allow the eccentric bearing 228 is rotatably inserted and fixed therein. An outer circumferential portion of the rotational shaft coupling portion 246 is connected to the orbiting wrap, so it serves to form the compression chamber together with the fixed wrap during a compression process.

Meanwhile, since the eccentric bearing 228 is inserted into the rotational shaft coupling portion 246, an end portion of the rotational shaft 226 is inserted through the disk of the fixed scroll 230, and the orbiting wrap, the fixed wrap, and the eccentric bearing 228 are installed to overlap in an lateral direction of the compressor. During a compressing operation, repulsive power of a refrigerant is applied to the fixed wrap and the orbiting wrap, and compressive force is applied between the rotational shaft support portion and the eccentric bearing as reaction force. In the case in which a portion of the shaft penetrates the disk to overlap with the wrap, repulsive power and compressive force of the refrigerant are applied to the same side on the basis of the disk, which are, thus, canceled out. Accordingly, the orbiting scroll may be prevented from tilting due to the action of the compressive force and repulsive power.

Although not shown, a discharge hole may be formed on the disk 242 to allow a compressed refrigerant to be discharged into the casing 210. A position of the discharge hole may be set arbitrarily in consideration of a required discharge pressure, and the like.

An oldhamring 250 is installed in an upper portion of the orbiting scroll 240 in order to prevent rotation of the orbiting scroll 240. Meanwhile, a lower frame 260 is installed in a lower portion of the casing 210 to rotatably support the lower side of the rotational shaft 226, and an upper frame 270 is installed in an upper portion of the orbiting scroll 240 in order to support the orbiting scroll 240 and the oldhamring 250. A hold is formed in the center of the upper frame 270. The hole communicates with the discharge hole of the orbiting scroll 240 to discharge a compressed refrigerant to the upper shell 212.

In the scroll compressor according to the second embodiment of the present invention configured as described above, the eccentric bearing 228 and the first bearing 234 have the same shape and are formed of the same material as those of the scroll compressor according to the first embodiment of the present invention. In particular, in the case of the scroll compressor according to the second embodiment, since the rotational shaft coupling portion is positioned in the central portion of the orbiting scroll 240, a space to be utilized as a compressive space in the disk of the orbiting scroll 240 can be significantly reduced. Thus, in general, the shaft penetrating-type scroll compressor should be increased in size to obtain the same compression ratio, relative to an otherwise compressor, but according to an embodiment of the present invention, since the thickness of the bearing is reduced to half or less of that of the related art, an increase in the size of the scroll compressor can be minimized.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A synthetic resin bearing as a journal bearing fixed to an orbiting scroll or a main frame and relatively rotated with respect to a rotational shaft in a scroll compressor, wherein the journal bearing is made of a PEEK material, wherein a thickness t of the journal bearing is smaller than a thickness t1 at which a temperature at a contact surface of the journal bearing with the rotational shaft during an operation of the scroll compressor corresponds to a glass transition temperature, and wherein the journal bearing is press-fit to the orbiting scroll or the main frame so as to be fixed to the orbiting scroll or the main frame, and wherein the thickness t of the journal bearing is greater than a minimum thickness t2 with which the journal bearing is press-fit without plastic deformation.

2. The synthetic resin bearing of claim 1, wherein the thickness t1 is smaller than 2 mm.

3. The synthetic resin bearing of claim 2, wherein the thickness t of the journal bearing <1 mm.

4. The synthetic resin bearing of claim 1, wherein when the orbiting scroll or the main frame is made of iron, the thickness t of the journal bearing >0.17 mm.

5. The synthetic resin bearing of claim 1, wherein the thickness t of the journal bearing satisfies 0.17 mm<t<1 mm.

6. A scroll compressor, comprising:
a casing;
a main frame fixed to the casing and having a shaft insertion hole formed therein;
a fixed scroll disposed above the main frame;
an orbiting scroll that forms a compression chamber together with the fixed scroll and includes a boss formed on a lower surface of the orbiting scroll;
a rotational shaft rotatably driven and having an end insertedly fixed in the boss in a state in which the rotational shaft is insertedly positioned in the shaft insertion hole; and
a journal bearing fixedly press-fit to the shaft insertion hole and the boss and made of a PEEK material, wherein a thickness with which a temperature in a contact surface between the rotational shaft and the journal bearing during an operation of the scroll compressor corresponds to a glass transition temperature is t1, wherein a minimum thickness with which the journal bearing is press-fit to the shaft insertion hole or the boss without plastic deformation is t2, and wherein a thickness t of the journal bearing satisfies t2<t<t1.

7. The scroll compressor of claim 6, wherein the thickness t1 is 1 mm.

8. The scroll compressor of claim 6, wherein the minimum thickness t2 is 0.17 mm.

9. The scroll compressor of claim 6, wherein the boss protrudes from an opposite side of an orbiting wrap of the orbiting scroll.

10. The scroll compressor of claim 6, wherein the fixed scroll includes a fixed wrap, and wherein the orbiting scroll includes an orbiting wrap that engages with the fixed wrap to form the compression chamber.

11. A scroll compressor comprising the synthetic resin bearing of claim 1.

12. The scroll compressor of claim 6, further comprising an oldham ring disposed between the orbiting scroll and the main frame to prevent rotation of the orbiting scroll.

13. The scroll compressor of claim 6, wherein the rotational shaft includes a drive pin formed to extend from an upper end of the rotational shaft, wherein the drive pin is eccentric with respect to a rotational center of the rotational shaft, and wherein the drive pin is insertedly fixed in the boss.

14. The scroll compressor of claim 6, further comprising a drive motor that rotatably drives the rotational shaft, wherein the drive motor includes a stator and a rotor rotatably inserted into the stator, and wherein the rotational shaft is insertedly fitted to a center of the rotor.

* * * * *